(12) United States Patent
Woodhead et al.

(10) Patent No.: US 11,044,607 B1
(45) Date of Patent: Jun. 22, 2021

(54) METHOD FOR GATEWAY ONBOARDING FOR IOT NETWORKS

(71) Applicant: Senet, Inc., Portsmouth, NH (US)

(72) Inventors: Jamie R. Woodhead, Pelham, NH (US); David L. Kjendal, Durham, NH (US)

(73) Assignee: Senet Inc., Portsmouth, NH (US)

( * ) Notice: Subject to any disclaimer, the term of this patent is extended or adjusted under 35 U.S.C. 154(b) by 148 days.

(21) Appl. No.: 16/206,396

(22) Filed: Nov. 30, 2018

Related U.S. Application Data

(60) Provisional application No. 62/594,133, filed on Dec. 4, 2017.

(51) Int. Cl.

| | |
|---|---|
| *H04L 29/06* | (2006.01) |
| *H04W 12/08* | (2021.01) |
| *H04W 12/06* | (2021.01) |
| *H04W 12/04* | (2021.01) |
| *H04W 88/16* | (2009.01) |
| *H04W 60/00* | (2009.01) |

(52) U.S. Cl.
CPC ........... *H04W 12/08* (2013.01); *H04W 12/04* (2013.01); *H04W 12/06* (2013.01); *H04W 60/00* (2013.01); *H04W 88/16* (2013.01)

(58) Field of Classification Search
CPC ..... H04W 12/08; H04W 12/06; H04W 88/16; H04W 12/04; H04W 60/00
USPC .............................................. 726/3–7, 11–12
See application file for complete search history.

(56) References Cited

U.S. PATENT DOCUMENTS

| | | | |
|---|---|---|---|
| 8,041,335 B2 | 10/2011 | Khetawat | |
| 10,275,962 B2* | 4/2019 | Britt | .................. H04W 4/80 |
| 10,403,394 B2* | 9/2019 | Ansari | ................. H04L 9/30 |
| 10,530,839 B2* | 1/2020 | Kitchen | ................ H04L 67/10 |
| 2013/0242757 A1 | 9/2013 | Tsai | |
| 2016/0112870 A1* | 4/2016 | Pathuri | .............. H04W 12/003 726/4 |
| 2017/0063967 A1* | 3/2017 | Kitchen | ................ H04L 67/02 |
| 2017/0063968 A1* | 3/2017 | Kitchen | ............. H04L 65/1033 |
| 2017/0149614 A1 | 5/2017 | Zheng | |
| 2017/0171181 A1* | 6/2017 | Britt | .................. H04L 63/0428 |
| 2017/0315820 A1 | 11/2017 | Entezari | |
| 2018/0115652 A1 | 4/2018 | Russell | |
| 2018/0373505 A1 | 12/2018 | Engquist | |

(Continued)

OTHER PUBLICATIONS

SAGA: Secure Auto-Configurable Gateway Architecture for Smart Home; Li et al; IEEE; Dec. 2019 (Year: 2019).*

(Continued)

*Primary Examiner* — Jahangir Kabir
(74) *Attorney, Agent, or Firm* — Maine Cernota & Rardin

(57) ABSTRACT

An apparatus, system, and method for gateway onboarding for the Internet of Things providing for securely controlling access to a network by a gateway through a self-service registration web portal. The method steps include entering serial number and gateway information into a self-service registration web portal by a user; submitting the registration request to network controller; attempting to connect to network by gateway by presenting the serial number; verifying, by the administrator, the serial number and user validity; if verified, approving gateway for access to network; allowing gateway on network; and issuing configuration parameters.

17 Claims, 12 Drawing Sheets

GATEWAY ONBOARDING ENVIRONMENT

(56) References Cited

U.S. PATENT DOCUMENTS

2020/0177589 A1* 6/2020 Mangalvedkar ........ H04L 67/12
2020/0279626 A1* 9/2020 Ansari ................ H04L 63/0876

OTHER PUBLICATIONS

Office Action dated May 14, 2020 for U.S. Appl. No. 16/403,898, 9 Pages.

* cited by examiner

GATEWAY ONBOARDING ENVIRONMENT

GATEWAY ONBOARDING FUNCTIONAL COMPONENTS

305

REGISTRATION WEB PORTAL PAGE

310

REGISTRATION WEB PORTAL PAGE

REGISTRATION WEB PORTAL PAGE

320

Register Gateway

Installation Information

| | |
|---|---|
| Antenna Type | External Omni |
| Antenna Height Above Ground Level (ft) | 15 |
| Network Connection | Ethernet |
| Install Location | Indoor |
| Building Material | Metal |
| Installation Notes | Located in Building 1, Office 23A |

< Back    Next >

REGISTRATION WEB PORTAL PAGE

REGISTRATION WEB PORTAL PAGE

330

REGISTRATION WEB PORTAL PAGE

335

Register Gateway

Does This Look Correct?

| | |
|---:|:---|
| Serial Number: | 56789123 |
| Description: | MultiTech Gateway - Building 1 - Office 23A |
| Street Address | 100 Market St, Portsmouth, NH 03801, USA |
| Device Type: | MultiTech Conduit |
| Antenna Type: | External Omni |
| Height: | 15 ft |
| Network Connection: | Ethernet |
| Install Location: | Indoor |
| Building Materials: | Metal |
| Installation Notes: | Located in Building 1, Office 23A |

< Back    Register

REGISTRATION WEB PORTAL PAGE

FIG. 3G

GATEWAY ONBOARDING STEPS

GATEWAY ONBOARDING ATTEMPT TO CONNECT TO NETWORK BY GATEWAY STEP 415 DETAILS

GATEWAY TO NETWORK CONTROLLER COMMUNICATION

METHOD FOR GATEWAY ONBOARDING FOR IOT NETWORKS

RELATED APPLICATIONS

This application claims the benefit of U.S. Provisional Applications No. 62/594,133 filed Dec. 4, 2017, which is herein incorporated by reference in its entirety for all purposes. Each of U.S. Provisional Patent Application No. 62/588,595 filed Nov. 20, 2017 and U.S. Utility patent application Ser. No. 16/196,011 filed Nov. 20, 2018, each titled IoT NETWORK CONTROLLER/SERVER is herein incorporated by reference in its entirety for all purposes.

FIELD OF THE DISCLOSURE

Embodiments relate to an apparatus, system, and method in the field of the Internet of Things and, more particularly, to a method for gateway onboarding which provides a system for securely controlling access to a network by a gateway through a self-service registration web portal.

BACKGROUND

The Internet of things (IoT) refers to the network of physical objects with Internet connectivity (connected devices), and the communication between them. These Internet-enabled devices and systems collect and exchange data. IoT has been defined as "the infrastructure of the information society". IoT extends Internet connectivity beyond traditional devices such as desktop and laptop computers and smart phones to a range of devices and everyday things that use embedded technology to communicate and interact with the external environment via the Internet.

There are great challenges to connecting such devices, as their numbers are in the billions, and many operate in critical systems. Scalability, security, and availability are critical attributes. Without these, delays can make applications unusable, and security breaches can risk data and much worse. Availability particularly can require devices to operate reliably, without intervention, over multiple years. Power consumption can be critical to support multi-year operation. Particularly, Low Power Wide Area Network (LPWAN) devices are expected to operate for ten or more years. Given the large numbers, cost can also be a critical factor. If costs per device are too high, entire fields of applications can be out of reach.

Access to these devices begins with gateways which control them. Gateways provide wireless bidirectional connectivity supporting the secure data transmission necessary for the IoT. While each gateway typically interfaces with many devices, there is nevertheless the need for speed and efficient deployment of gateways.

What is needed is an apparatus, system, and method for gateway onboarding for IoT networks that is secure, low-cost, low-power, and fast.

SUMMARY

An embodiment provides an apparatus for gateway onboarding providing secure access control to an Internet of Things (IoT) network by a gateway through a self-service registration web portal comprising a gateway device (607); a network server (608); a database (609); an admin portal (610); and an IoT network (430); entering information to a registration web portal (405); submitting a registration request to a network controller (410); attempting to connect to network by gateway (415); verifying (420); if verified, approving the gateway for access to the IoT network (425); allowing the gateway on the IoT network (430); and issuing configuration parameters (435). In embodiments, the step of entering information to registration web portal (405) comprises a user account; and a secure channel for all communications. In other embodiments a user account was previously setup and approved for portal access. In subsequent embodiments, the step of submitting registration request to network controller (410) comprises key information about installation comprising a geographic location; a gateway type; and a serial number; and wherein the serial number is used to reconcile the registration request through the portal with the registration request from the gateway. For additional embodiments, the step of attempting to connect to the network by the gateway (415) comprises the gateway starting in an unregistered state; an agent, running on the gateway, configured to communicate to the Network Server when in its initial state; wherein the gateway periodically resends the registration request to the network server; and until the request is approved by the admin, the network server returns a negative response to the gateway, leaving the gateway in an unregistered state. In another embodiment, the step of verifying (420) comprises using an administration portal on the network server, verifying the authenticity of the request comprising determining that the serial number is well-formed for a gateway manufacturer; and user and deployment location are as expected. For a following embodiment the step of if verified, approving gateway for access to network the gateway (425) comprises marking as approved in the database. In subsequent embodiments, the step of allowing gateway on network (430) comprises the gateway continuing to attempt to register; if the gateway is marked as approved in the database, the next gateway request to register receives a success response. In additional embodiments, the step of issuing configuration parameters (435) comprises the gateway responding with an acknowledgment of registration; and the network server responding with an appropriate configuration.

Another embodiment provides a system for gateway onboarding providing secure access control to an Internet of Things (IoT) network by a gateway through a self-service registration web portal comprising entering information into a self-service registration web portal by a user; submitting the registration request to a network controller; attempting to connect to the IoT network by the gateway by presenting the serial number; verifying the serial number and user validity; if verified, approving the gateway for access to the IoT network; allowing the gateway on the IoT network; and issuing configuration parameters. Included embodiments comprise entering a serial number and gateway information into the self-service registration web portal by the user. Yet further embodiments comprise an agent, running on the gateway, configured to communicate to the Network Server when in its initial state. Related embodiments comprise security keys for future communication. For further embodiments the gateway repeats sending at a configurable interval, wherein new registrations continue to try indefinitely until registration is accepted or administratively canceled. In ensuing embodiments installation information comprises antenna type, antenna height above ground level, type of network connection, install location, building material, and installation notes. For yet further embodiments, the step of verifying serial number and user validity (420) comprises using an administration portal on the network server, whereby the admin verifies the authenticity of the request. For more embodiments, the step of verifying serial number and user validity by administrator (420) comprises verifying the authenticity of the request comprising determining that the serial number is well-formed for a gateway manufacturer; and user and deployment location are as expected. In continued embodiments, the step of verifying serial number and user validity comprises an automated process. For additional embodiments, the network server responds with an appropriate configuration comprising security keys for future communication; a gateway monitoring configuration and RF attributes to use when communicating with End-Devices.

A yet further embodiment provides a method for gateway onboarding providing secure access control to an Internet of Things (IoT) network by a gateway through a self-service registration web portal comprising a Gateway 607 attempting to connect to internet 612 comprising repeating 614 Gateway 607 communicating 616 to a Network Server 608; the Network Server 608 communicating registration Request 618 to a Database 609 and to the Gateway 607; the Database 609 communicating 622 to Admin Portal 610; the Gateway 607 communicating 624 to the Network Server 608; the Network Server 608 communicating 626 to Database 609; the Database 609 communicating 628 to Network Server 608; the Network Server 608 communicating 630 to Gateway 607; an Admin 604 sending an Approve Registration Request 632 to the Admin Portal 610; the Admin Portal 610 communicating 634 to Network Server 608; the Gateway 607 communicating 636 to Network Server 608; the Network Server 608 communicating 638 to Database 609; the Database 609 communicating 640 to Network Server 608; the Network Server 608 communicating 642 to Gateway 607; and beginning normal IoT operation 644.

The features and advantages described herein are not all-inclusive and, in particular, many additional features and advantages will be apparent to one of ordinary skill in the art in view of the drawings, specification, and claims. Moreover, it should be noted that the language used in the specification has been selected principally for readability and instructional purposes and not to limit the scope of the inventive subject matter.

BRIEF DESCRIPTION OF THE DRAWINGS

FIGS. 3A-3G depict registration web portal pages configured in accordance with an embodiment.

Figure 1:
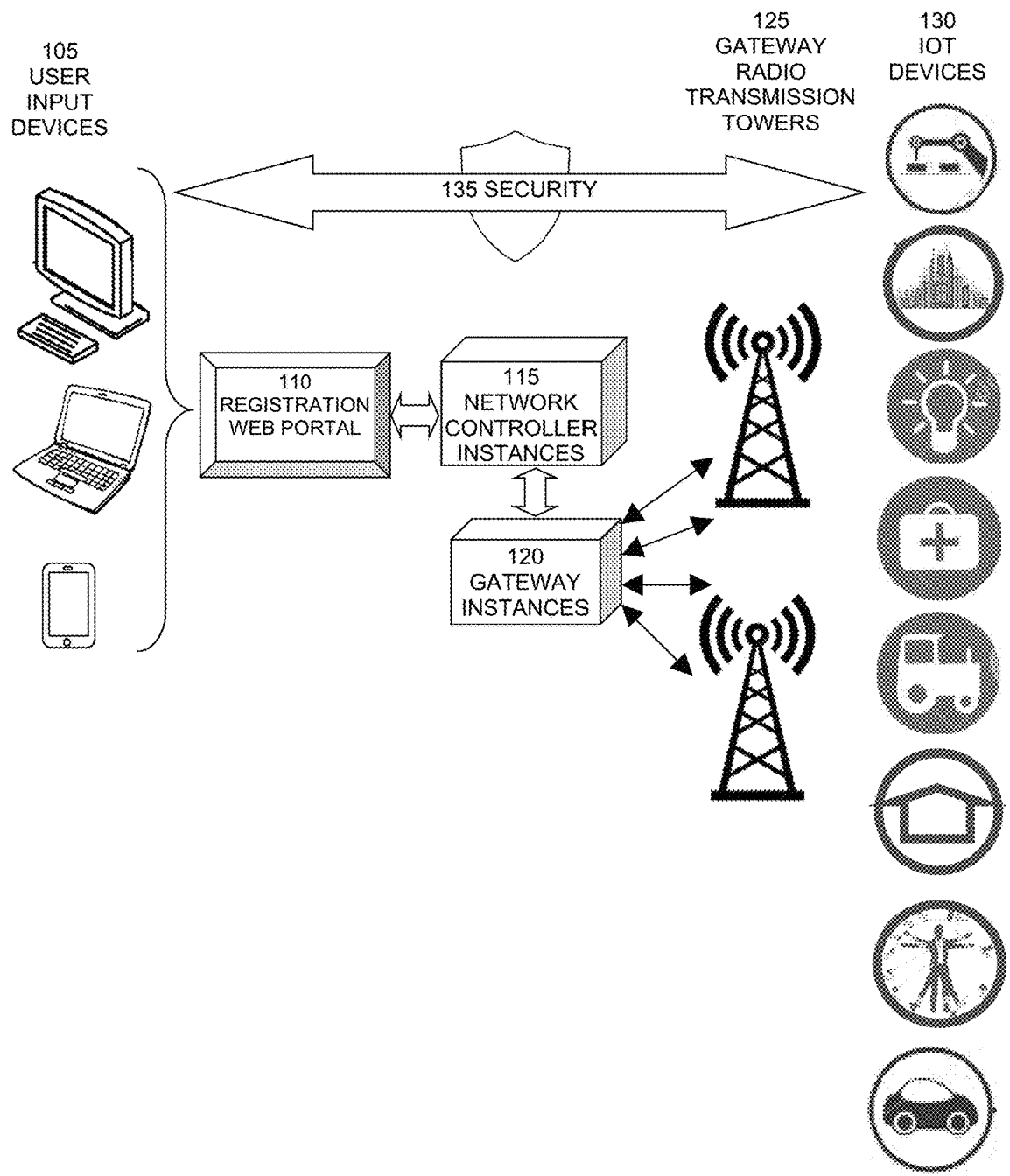
FIG. 1 depicts a gateway onboarding environment configured in accordance with an embodiment of the invention.

These and other features of the present embodiments will be understood better by reading the following detailed description, taken together with the figures herein described. The accompanying drawings are not intended to be drawn to scale. For purposes of clarity, not every component may be labeled in every drawing.

DETAILED DESCRIPTION

The features and advantages described herein are not all-inclusive and, in particular, many additional features and advantages will be apparent to one of ordinary skill in the art in view of the drawings, specification, and claims. Moreover, it should be noted that the language used in the specification has been selected principally for readability and instructional purposes, and not to limit in any way the scope of the inventive subject matter. The invention is susceptible of many embodiments. What follows is illustrative, but not exhaustive, of the scope of the invention.

An embodiment provides a method for gateway onboarding which provides a system for securely controlling access to a network by a gateway through a self-service registration web portal with or without administrative approvals. It comprises entering serial number and gateway information into a self-service registration web portal by a user; submitting the registration request to network controller; attempting to connect to network by gateway by presenting the serial number; verifying, by the administrator, the serial number and user validity; if verified, approving gateway for access to network; allowing gateway on network; and issuing configuration parameters. Embodiments comprise entering information to registration web portal; submitting registration request to network controller; attempting to connect to network by gateway; verifying by administrator; if verified, approving gateway for access to network; allowing gateway on network; and issuing configuration parameters. In other embodiments, the step of entering information to registration web portal comprises that (1) a User account was previously setup and approved for Portal access; and (2) All communication is over a secure channel. In subsequent embodiments, the step of submitting registration request to network controller comprise (1) User entering key information about installation comprising (1a) Geographic location; (1b) Gateway type; and (1c) Serial number; and (2) wherein Serial number is important, wherein this will later be used to reconcile the registration request through the portal with the registration request from the gateway. For additional embodiments the step of attempting to connect to network by gateway comprises (1) The gateway starting in an unregistered state; (2) An agent, running on the gateway, configured to communicate to the Network Server when in its initial state; (3) Wherein the gateway will periodically (every 1 minute for example) resend the registration request to the network server; and (4) Until the request is approved by the admin, the Network Server will return a negative response to the gateway leaving the gateway in the unregistered state. In another embodiment, the step of verifying serial number and user validity by administrator comprises (1) using an Administration portal on the Network Server, the admin verifies the authenticity of the request comprising (1a) is the serial number well-formed for the gateway manufacturer; and (1b) are the user and deployment location as expected? For a following embodiment the step of if verified, approving gateway for access to network the gateway comprises marking as approved in the database. In subsequent embodiments the step of allowing gateway on network comprises (1) gateway continuing to attempt to register; (2) since the gateway is marked as approved in the database, the next gateway request to register will get a success response. In additional embodiments the step of issuing configuration parameters comprises (1) The gateway responding with acknowledgment of the registration; (2) The network server responding with the appropriate configuration comprising (2a) security keys to use for future communication; (2b) gateway monitoring configuration and (2c) RF attributes to use when communicating with End-Devices.

FIG. 1 depicts a gateway onboarding environment 100. Components comprise user input devices 105; registration web portal 110; network controller instances 115; gateway instances 120; gateway radio transmission towers 125; IoT devices 130; and overarching security 135.

Figure 2:
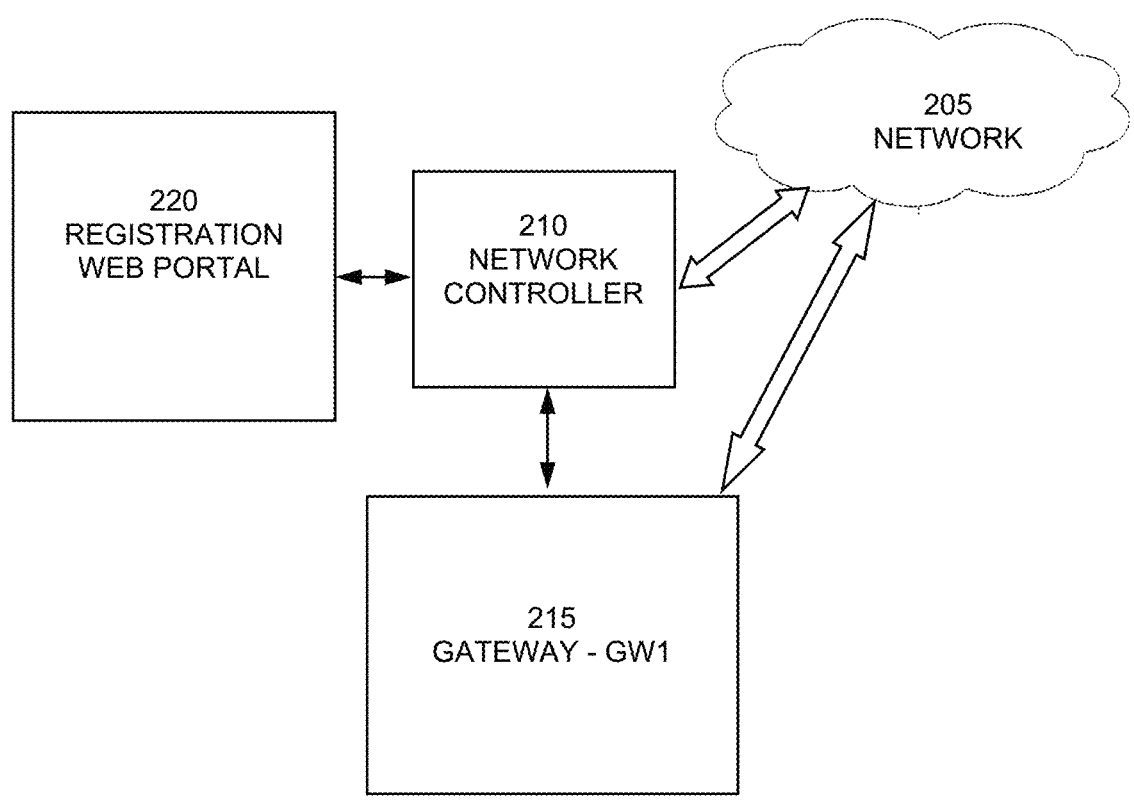
FIG. 2 depicts gateway onboarding functional components configured in accordance with an embodiment of the invention.

FIG. 2 depicts gateway onboarding functional components 200 for Gateway Onboarding. Gateway Onboarding provides a system for controlling access to a Network 205 through a Network Controller 210 by a Gateway 215 through a self-service Registration Web Portal 220.

FIGS. 3A-3G depict registration web portal pages 300-335.

Figure 3A:
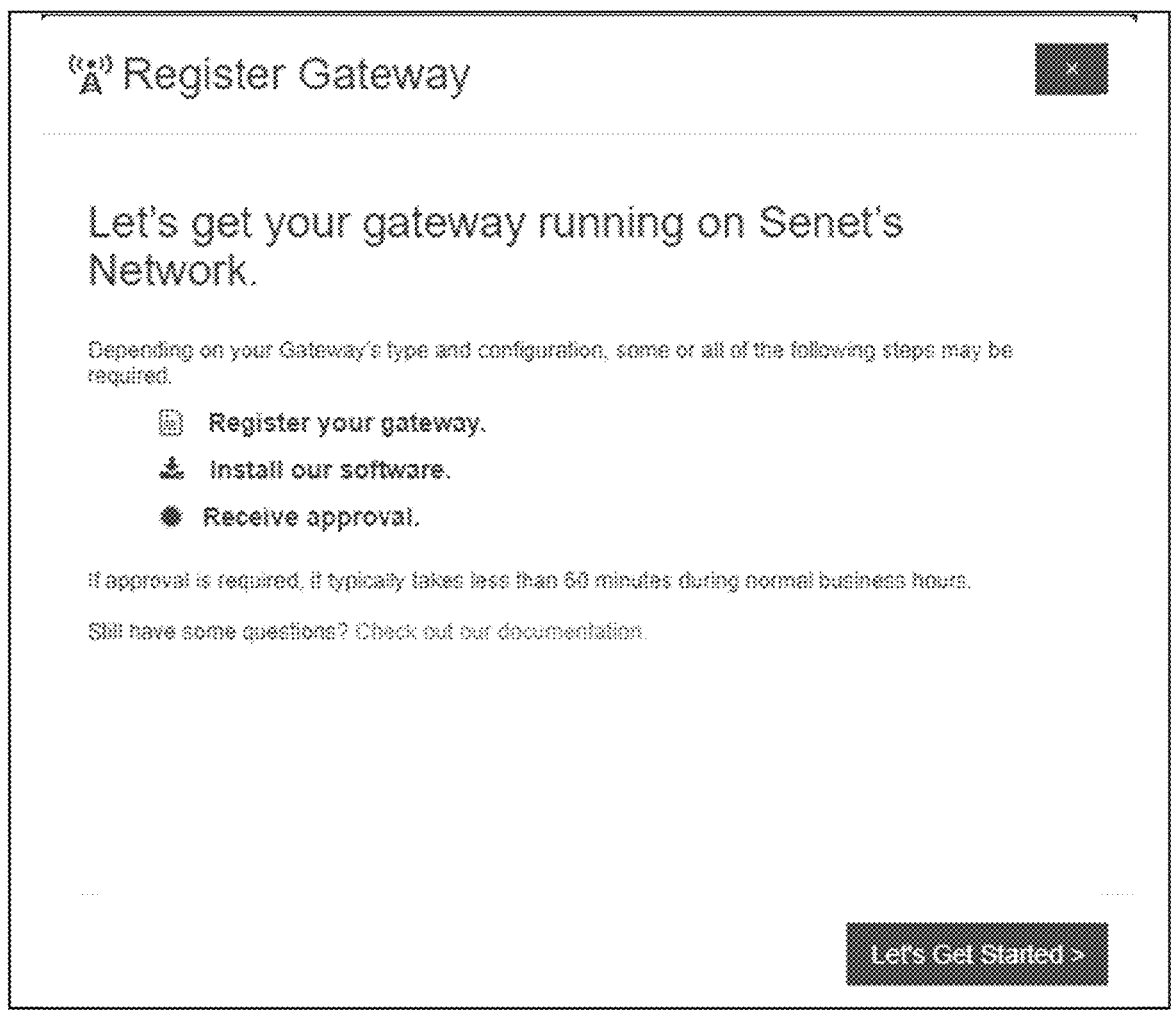

FIG. 3A is a screenshot of an Initial Registration page 305. In embodiments, steps comprise registering, installing software, and receiving approval.

Figure 3B:
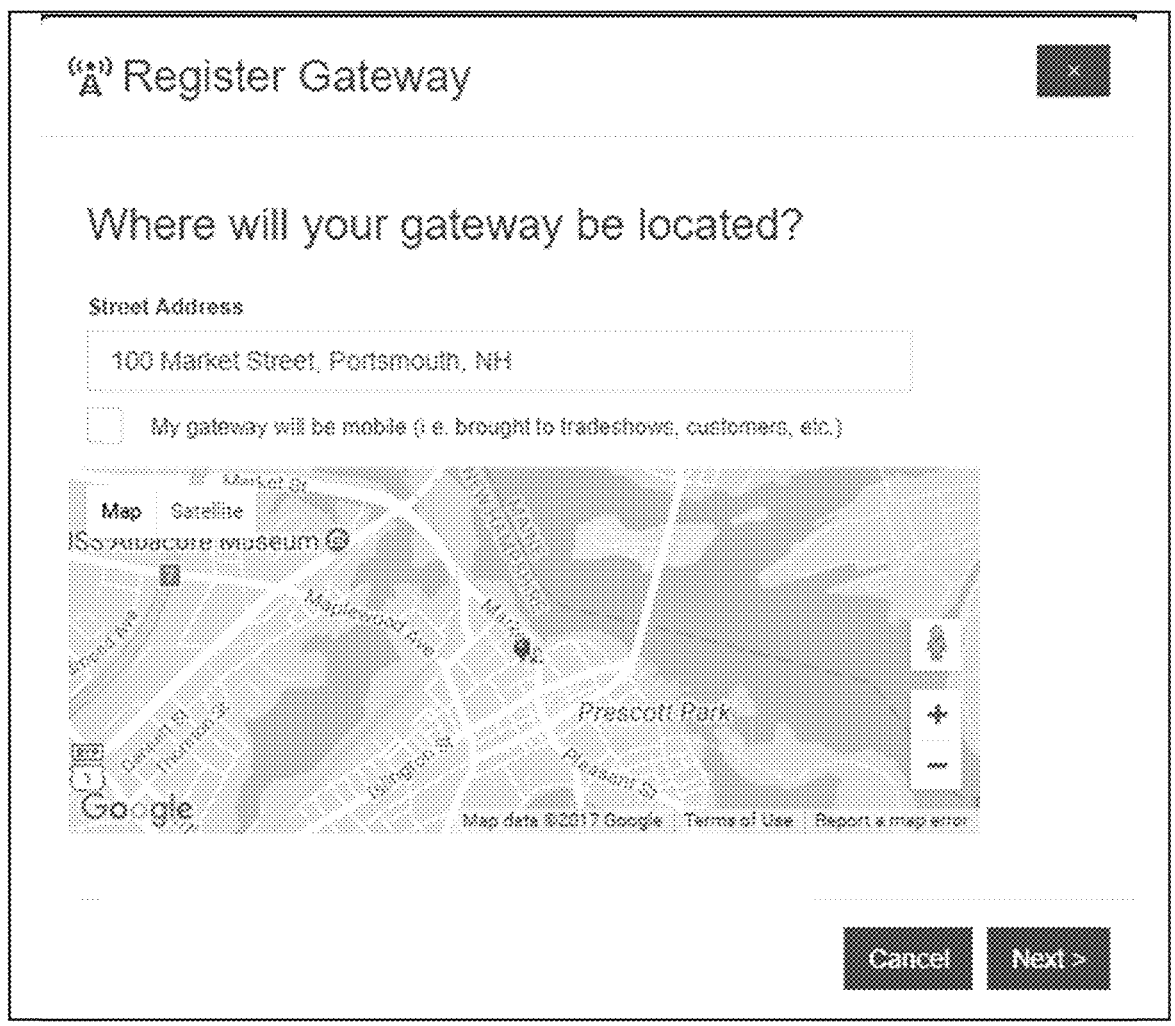

FIG. 3B is a screenshot of a Gateway Location registration page 310. In embodiments, location information comprises a street address and an indication if the gateway is mobile.

Figure 3C:
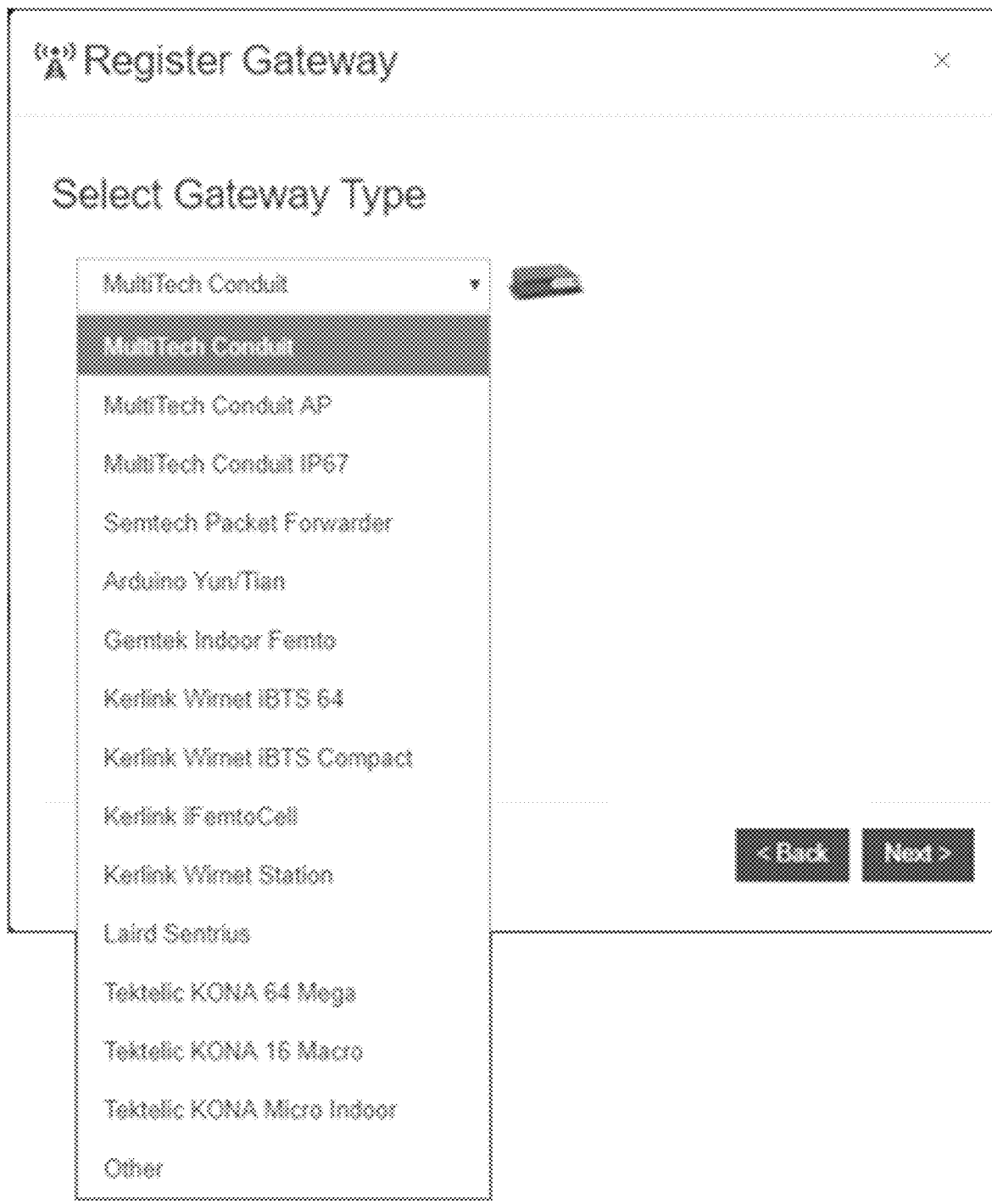

FIG. 3C is a screenshot of a Gateway Type registration page 315.

FIG. 3D is a screenshot of an Installation Information registration page 320. In embodiments, installation information comprises antenna type, antenna height above ground level, type of network connection, install location, building material, and installation notes.

Figure 3E:

FIG. 3E is a screenshot of a Gateway Information registration page 325. In embodiments, Gateway Information comprises a serial number and a description.

Figure 3F:
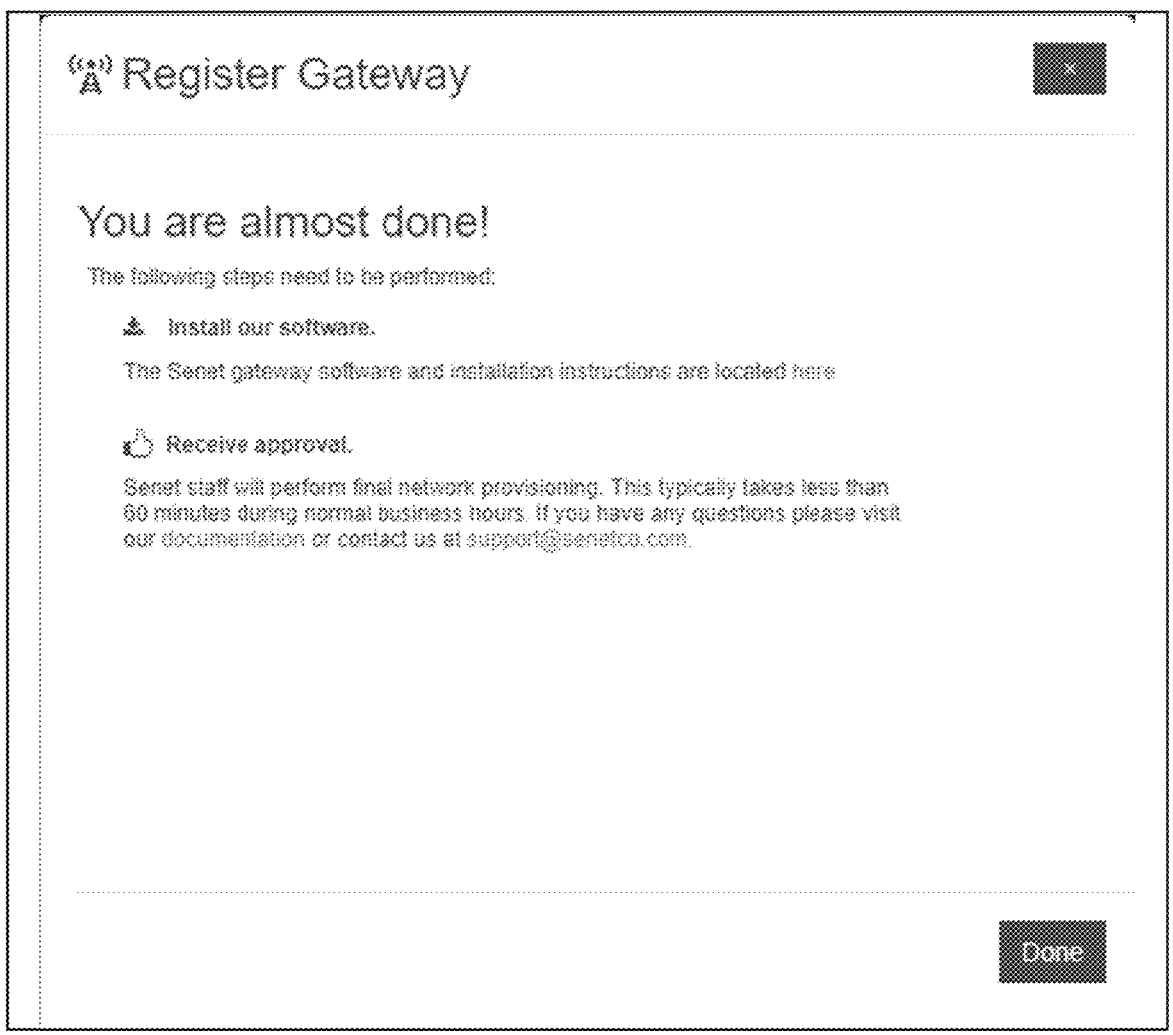

FIG. 3F is a screenshot of a Software Installation an Approval registration page 330. Embodiments comprise installation of software and receiving approval for final network provisioning.

FIG. 3G is a screenshot of an Information Confirmation registration page 335. In embodiments, confirmation comprises serial number, description, street address, device type, antenna type, height, network connection type, install location, building materials, and installation notes.

Figure 4:
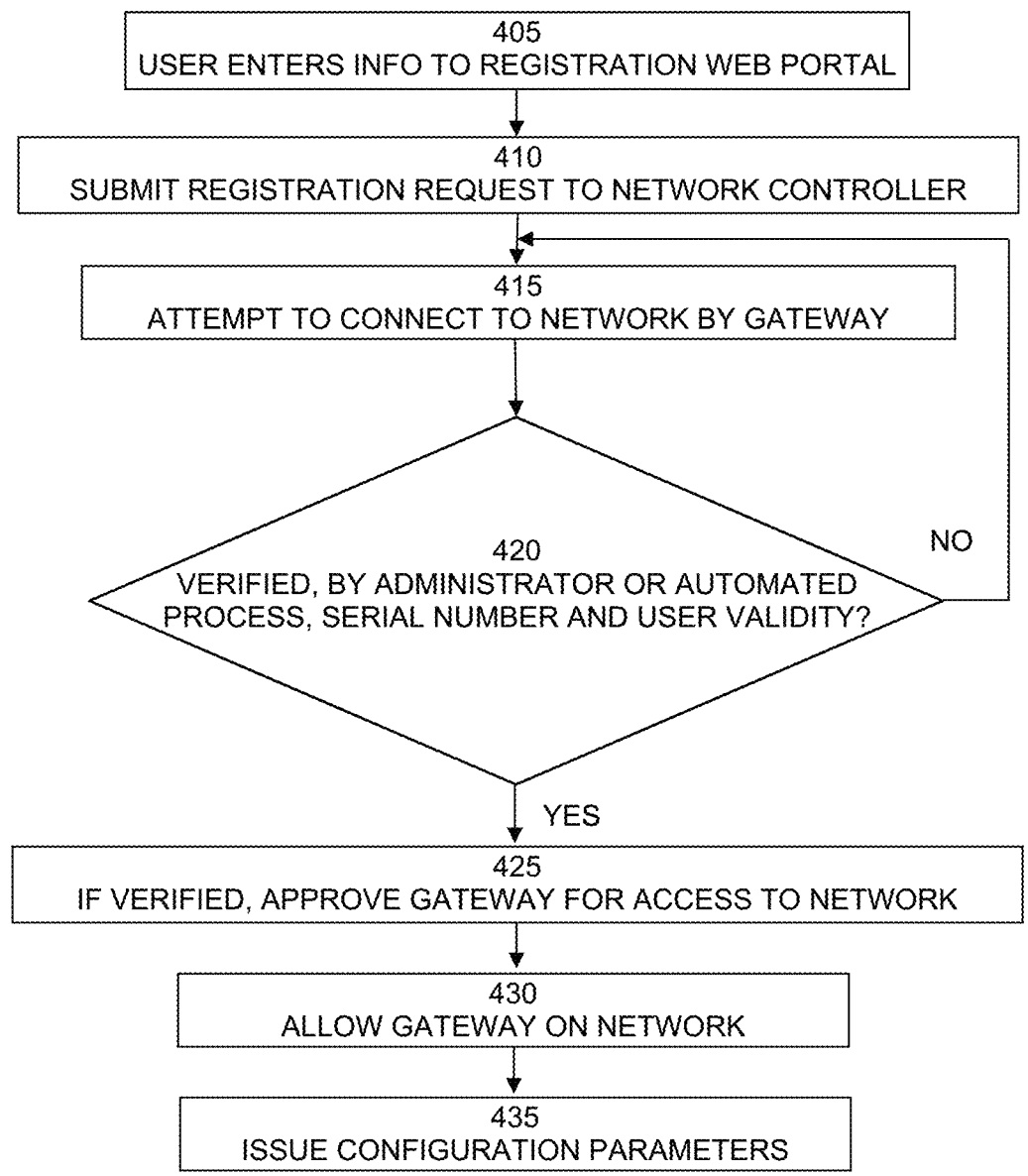
FIG. 4 is a flowchart of gateway onboarding steps configured in accordance with an embodiment.

FIG. 4 is a flow chart 400 of a method for Gateway Onboarding. As introduced in FIG. 2, Gateway Onboarding provides a system for securely controlling access to a Network by a Gateway through a self-service Registration Web Portal with or without administrative approvals. Gateway Onboarding process embodiments comprise: 1) entering serial number and Gateway information into self-service Registration Web Portal by a user 405; 2) submitting the Registration request to Network Controller 410; 3) attempting to connect to Network by Gateway by presenting the serial number 415; 4) verifying, by the Administrator or through an automated process, the serial number and user validity 420; 5) if verified, approving Gateway for access to Network 425; 6) allowing Gateway on Network 430; and 7) issuing configuration parameters 435. If not verified, returning to attempting to connect to network by gateway 415.

Embodiments for the step of User Enters Info To Registration Web Portal 405 comprise: (1) a user account that was previously setup and approved for portal access, (2) all communication conducted over a secure channel. Embodiments for the step of Submit Registration Request To Network Controller 410 comprise: (1) user entering key information about installation (1a) geographic location (1b) gateway type (1c) and serial number (2). Serial number is important. This will later be used to reconcile the registration request through the portal with the registration request from the gateway. Embodiments for the step of Attempt To Connect To Network By Gateway 415 comprise: the gateway periodically resending a registration request to the network server until the request is approved. Embodiments for the step of Verify, By Administrator, Serial Number And User Validity 420 comprise: (1) using an administration portal on the network server, the admin verifies the authenticity of the request, (1a) is the serial number formatted appropriately for the specified gateway for the gateway manufacturer, and (1b) are the user and deployment location as expected? Embodiments for the step of If Verified, Approve Gateway For Access To Network 425 comprise: the gateway marked as approved in the database. Embodiments for the step of Allow Gateway On Network 430 comprise: (1) the gateway (as in step 415) continues to attempt to register, (2) since the gateway is marked as approved in the database, the next gateway request to register will get a success response. Embodiments for the step of Issue Configuration Parameters 435 comprise: (1) the gateway responding with acknowledgment of the registration, (2) the network server responding with the appropriate configuration comprising: (2a) security keys to use for future communication, (2b) gateway monitoring configuration, and (2c) RF attributes to use when communicating with end-devices.

Figure 5:
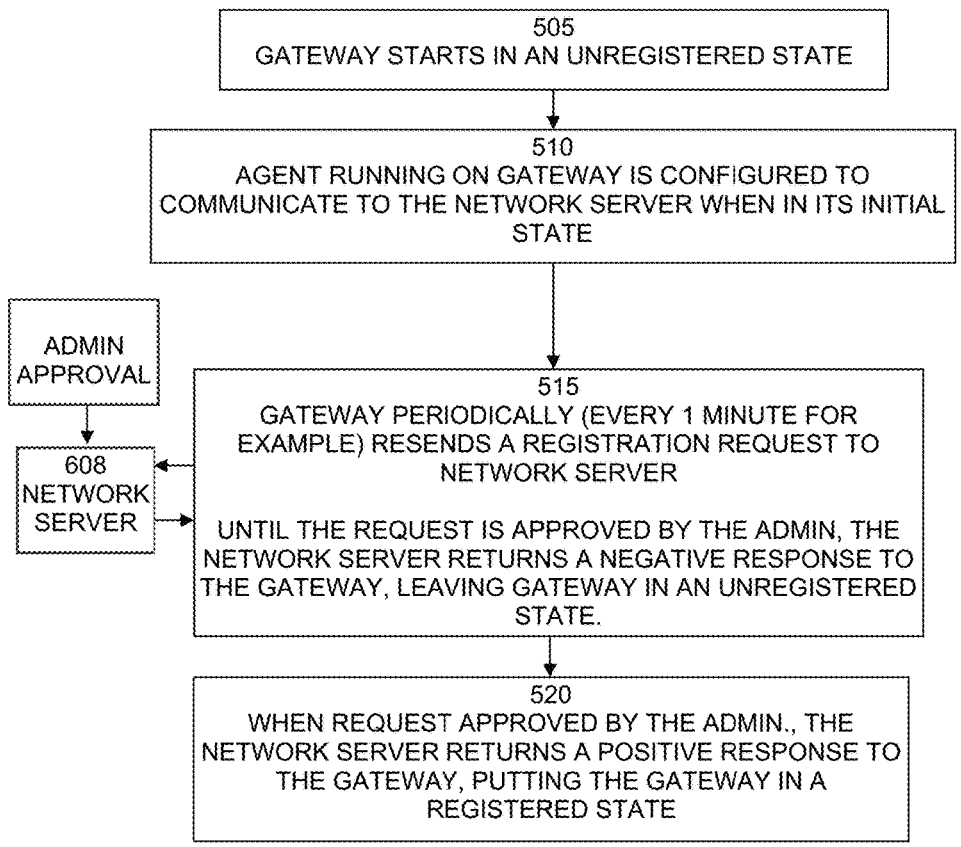
FIG. 5 is a flow chart of gateway onboarding step details configured in accordance with an embodiment.

FIG. 5 depicts detail sub-steps 500 from step 415 of FIG. 4. Embodiments for the step of Attempt To Connect To Network By Gateway 415 comprise: the gateway starting in an unregistered state 505; the agent running on the gateway configured to communicate to the network server when in its initial state 510; the gateway periodically (every 1 minute for example) resending the registration request to the network server 515, until the request is approved by the admin, the network server will return a negative response to the gateway leaving the gateway in the unregistered state; when the request is approved by the admin., the network server returns a positive response to the gateway, putting the gateway in a registered state 520.

Figure 6:
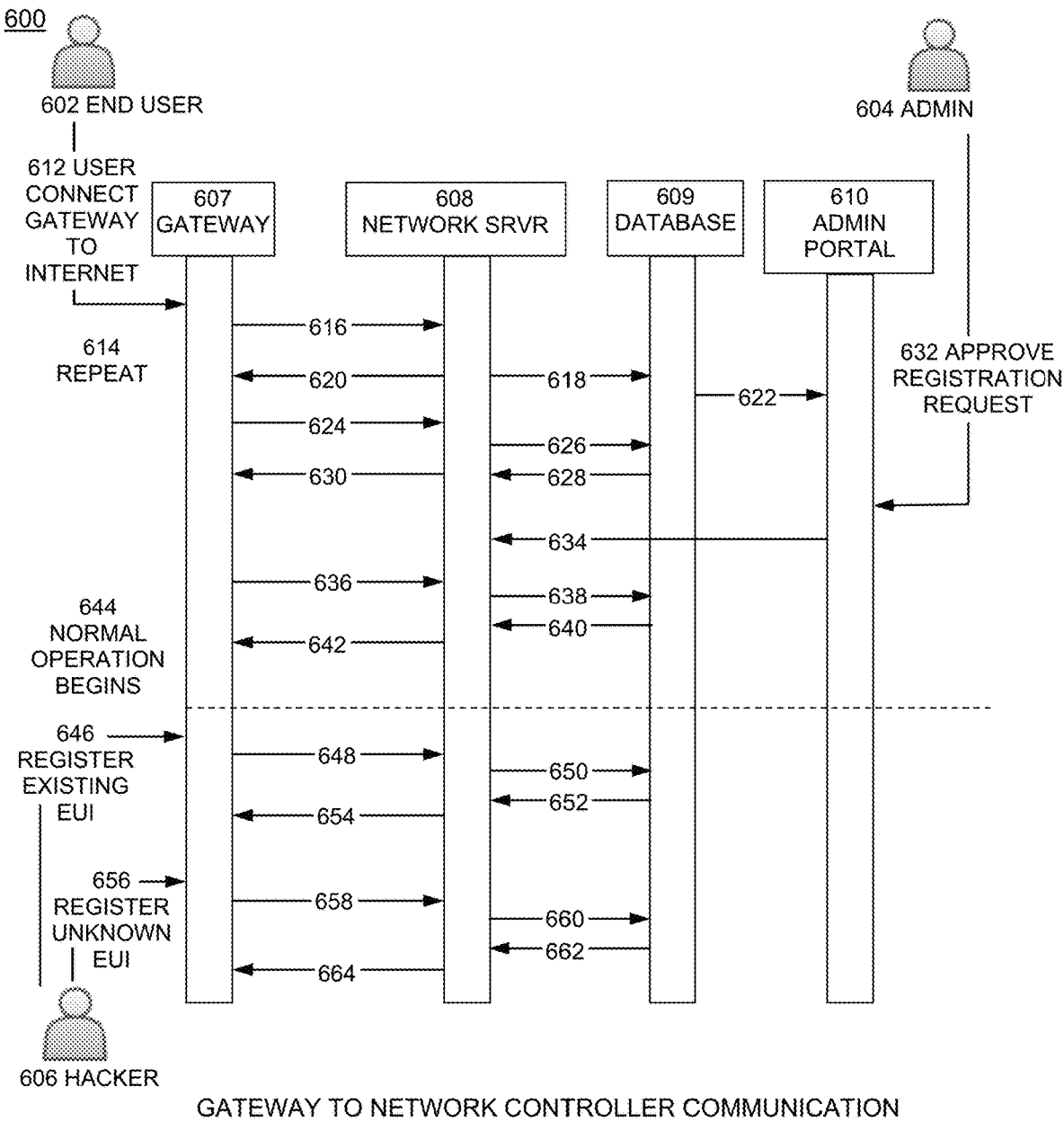
FIG. 6 depicts gateway to network controller communications configured in accordance with an embodiment.

FIG. 6 depicts Gateway to Network Controller Communications 600. Participants comprise End User 602, Administrator 604, and Hacker 606. Components comprise Gateway 607, Network Server 608, Database 609, and Administrator Portal 610. Communications comprise user 602 connecting Gateway 607 to internet 612, repeated every, for example 30 seconds, as needed 614. Gateway 607 communicates 616 to Network Server 608. Network Server 608 communicates registration Request 618 to Database 609, and ret:registrationPending 620 to Gateway 607. Database 609 communicates showPendingReg 622 to Admin Portal 610. Gateway 607 communicates 624 to Network Server 608. Network Server 608 communicates registrationRequest 626 to Database 609. Database 609 communicates regPending 628 to Network Server 608. Network Server 608 communicates ret:registrationAlreadyPending 630 to Gateway 607. Admin 604 sends Approve Registration Request 632 to Admin Portal 610. Admin Portal 610 communicates regApproved 634 to Network Server 608. Gateway 607 communicates 636 to Network Server 608. Network Server 608 communicates registrationRequest 638 to Database 609. Database 609 communicates reginfo 640 to Network Server 608. Network Server 608 communicates ret:registrationApproved apikey 642 to Gateway 607, and normal operation begins 644. In embodiments, RESTful web services on the network server process requests.

Following normal operation beginning 644 (for EUI=XYZ), Hacker 606 attempts to register existing EUI 646 at Gateway 607. Gateway 607 communicates 648 to Network Server 608. Network Server 608 communicates registrationRequest 650 to Database 609. Database 609 communicates unknownEUI 652 to Network Server 608.

Network Server 608 communicates err:unknown resource 654 to Gateway 607. Hacker 606 then attempts to register unknown EUI 656 at Gateway 607. Gateway 607 communicates 658 to Network Server 608. Network Server 608 communicates registrationRequest 660 to Database 609. Database 609 communicates unknownEUI 662 to Network Server 608. Network Server 608 communicates err:unknown resource 664 to Gateway 607.

The computing system used in the Internet of Things (IoT) Network Controller/Server platform for performing (or controlling) the operations or functions described hereinabove with respect to the system and/or the method may include a processor, I/O devices, a memory system, and a network adaptor. The computing system includes program modules for performing (or controlling) the operations or functions described hereinabove with respect to the system and/or the method according to exemplary embodiments. For example, the program modules may include routines, programs, objects, components, logic, data structures, or the like, for performing particular tasks or implement particular abstract data types. The processor may execute instructions written in the program modules to perform (or control) the operations or functions described hereinabove with respect to the system and/or the method. The program modules may be programmed into the integrated circuits of the processor. In an exemplary embodiment, the program modules may be stored in the memory system or in a remote computer system storage media.

The computing system may include a variety of computing system readable media. Such media may be any available media that is accessible by the computer system, and it may include both volatile and non-volatile media, removable and non-removable media.

The memory system can include computer system readable media in the form of volatile memory, such as random access memory (RAM) and/or cache memory or others. The computer system may further include other removable/non-removable, volatile/non-volatile computer system storage media. The computer system can communicate with one or more devices using a network adapter. The network adapter may support wired communications based on Internet, LAN, WAN, or the like, or wireless communications based on CDMA, GSM, wideband CDMA, CDMA-2000, TDMA, LTE, wireless LAN, Bluetooth, or the like.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++ or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to a flowchart illustration and/or block diagram of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The foregoing description of the embodiments has been presented for the purposes of illustration and description. It is not intended to be exhaustive or to limit the invention to the precise form disclosed. Many modifications and variations are possible in light of this disclosure. It is intended that the scope of the present disclosure be limited not by this detailed description, but rather by the claims appended hereto.

A number of implementations have been described. Nevertheless, it will be understood that various modifications may be made without departing from the scope of the disclosure. Although operations are depicted in the drawings in a particular order, this should not be understood as requiring that such operations be performed in the particular order shown or in sequential order, or that all illustrated operations be performed, to achieve desirable results.

Each and every page of this submission, and all contents thereon, however characterized, identified, or numbered, is considered a substantive part of this application for all purposes, irrespective of form or placement within the application. This specification is not intended to be exhaustive or to limit the invention to the precise form disclosed. Many modifications and variations are possible in light of this disclosure. Other and various embodiments will be readily apparent to those skilled in the art, from this description, figures, and the claims that follow. It is intended that the scope of the invention be limited not by this detailed description, but rather by the claims appended hereto.

What is claimed is:

1. An apparatus for gateway onboarding providing secure access control to an Internet of Things (IoT) network by a gateway through a self-service registration web portal comprising:
   a gateway device;
   an agent;
   a network server;
   a network controller;
   a database;
   an admin portal;
   an IoT network; and
   a self-service registration web portal:
   receives a serial number and gateway information, entered by a user, into the self-service registration web portal;
   submits a gateway device registration request from the self-service registration web portal to the network controller;
   said gateway device attempts to connect said gateway device to said IoT network by; wherein said step of attempting to connect said gateway device to said IoT network by said gateway device comprises:
      said gateway device configured to start in an unregistered state;
      the agent, running on said gateway device, configured to communicate to the network server when in its initial state;
      wherein said gateway device periodically resends said gateway device registration request to said network server; and
      until said gateway device registration request is approved by an admin through the admin portal, said network server returns a negative response to said gateway device, leaving said gateway device in an unregistered gateway state;
   the admin verifies the serial number and user validity;
   in response to the positive verification, approves the gateway device for access to the IoT network;
   allows the gateway device on the IoT network; and
   issues configuration parameters.

2. The apparatus of claim 1, wherein said step of entering information to registration web portal comprises:
   a user account; and
   a secure channel for all communications.

3. The apparatus of claim 1, wherein a user account was previously setup and approved for portal access.

4. The apparatus of claim 1, wherein said step of submitting registration request to network controller comprises:
   key information about installation comprising:
      a geographic location;
      a gateway type; and
      a serial number.

5. The apparatus of claim 1, wherein said step of verifying comprises:
   using an administration portal on said network server verifying the authenticity of the request comprising:
      determining that said serial number is well-formed for a gateway manufacturer; and
      user and deployment location are as expected.

6. The apparatus of claim 1, wherein said step of if verified, approving gateway for access to network the gateway comprises:
   marking as approved in said database.

7. The apparatus of claim 1, wherein said step of allowing gateway on network comprises:
  said gateway continuing to attempt to register;
  if said gateway is marked as approved in the database, the next gateway request to register receives a success response.

8. The apparatus of claim 1, wherein said step of issuing configuration parameters comprises:
  said gateway responding with an acknowledgment of registration; and
  said network server responding with an appropriate configuration.

9. A system for gateway onboarding providing secure access control to an Internet of Things (IoT) network by a gateway device through a self-service registration web portal, the system comprising:
  said gateway device;
  said IoT network;
  said self-service registration web portal;
  a network controller;
  a user input device;
  an agent;
  said gateway device configured to attempt to connect said gateway device to said IoT network;
  said IoT network configured to connect to devices;
  said self-service registration web portal configured to receive a gateway device registration request;
  said network controller configured to receive a gateway device registration request;
  said user input device configured for entering gateway device registration information into said self-service registration web portal by a user;
  said agent configured to communicate to a network server when in its initial state;
  receives a serial number and gateway information, entered by a user, into the self-service registration web portal;
  submits the gateway device registration request from the self-service registration web portal to said network controller;
  said gateway device attempts to connect said gateway device to the IoT network by presenting the serial number; wherein said step of attempting to connect said gateway device to said IoT network by said gateway comprises:
    said gateway device configured to start in an unregistered state;
    said agent configured for running on said gateway device, configured to communicate to the Network Server when in its initial state;
    wherein said gateway periodically resends said gateway device registration request to said network server; and
    until said gateway device registration request is approved by the admin, said network server returns a negative response to said gateway device, leaving said gateway in an unregistered gateway state;
  an administrator verifies the serial number and user validity;
  in response to the positive verification, approves the gateway device for gateway access to the IoT network;
  allows the gateway device gateway access on the IoT network; and
  issues configuration parameters.

10. The system of claim 9 comprising:
  security keys for future communication.

11. The system of claim 9, wherein said gateway repeats sending at a configurable interval, wherein new registrations continue to try indefinitely until registration is accepted or administratively canceled.

12. The system of claim 9, wherein installation information comprises:
  antenna type, antenna height above ground level, type of network connection, install location, building material, and installation notes.

13. The system of claim 9, wherein said step of verifying serial number and user validity comprises:
  using an administration portal on said network server, whereby said admin verifies the authenticity of the request.

14. The system of claim 9, wherein said step of verifying serial number and user validity comprises:
  verifying the authenticity of the request comprising:
    determining that said serial number is well-formed for a gateway manufacturer; and
    user and deployment location are as expected.

15. The system of claim 9, wherein said step of verifying serial number and user validity comprises an automated process.

16. The system of claim 9, wherein said network server responds with an appropriate configuration comprising:
  security keys for future communication;
  a gateway monitoring configuration and
  Radio Frequency (RF) attributes to use when communicating with End-Devices.

17. A method for gateway onboarding providing secure access control to an Internet of Things (IoT) network by a gateway through a self-service registration web portal comprising:
  receiving, a serial number and gateway information, entered by a user, into the self-service registration web portal;
  a Gateway attempting to connect said Gateway to said IoT network comprising:
  repeating Gateway communicating to a Network Server;
  said Network Server communicating registration Request to a Database and to said Gateway;
  said Database communicating to Admin Portal;
  said Gateway communicating a gateway device registration request to said Network Server;
  said Network Server communicating to Database;
  said Database communicating to Network Server;
  said Network Server communicating to Gateway;
  an Admin sending an Approve Registration Request to said Admin Portal;
  said Admin Portal communicating to Network Server;
  said Gateway communicating to Network Server;
  said Network Server communicating to Database;
  said Database communicating to Network Server;
  said Network Server communicating to Gateway; wherein attempting to connect said gateway device to said IoT network by said Gateway comprises:
    said Gateway starting in an unregistered state;
    an agent, running on said Gateway, communicating to the Network Server when said gateway device is in its initial state;
    receives a serial number and gateway information, entered by a user into the self-service registration web portal;
    wherein said Gateway periodically resends said gateway device registration request to said Network Server; and until said request is approved by the admin, said Network Server returning a negative response to said Gateway, leaving said Gateway in an unregistered state;

the admin portal verifies the serial number and user validity;

in response to the positive verification, approves the gateway device for gateway access to the IoT network; and beginning normal IoT operation.

* * * * *